United States Patent Office 3,541,020
Patented Nov. 17, 1970

3,541,020
CALCIUM HALOPHOSPHATE PHOSPHORS
Hideo Mizuno, Takatsuki-shi, Japan, assignor to Matsushita Electronics Corporation, Osaka, Japan, a corporation of Japan
Filed Mar. 24, 1966, Ser. No. 537,144
Claims priority, application Japan, Mar. 30, 1965, 40/19,321
Int. Cl. C09k 1/36
U.S. Cl. 252—301.4                               2 Claims

ABSTRACT OF THE DISCLOSURE

Calcium halophosphate phosphors are activated with antimony, manganese, and terbium. The terbium improves the green emission and the overall emission efficiency of the phosphors. These phosphors are useful in fluorescent discharge lamps.

---

This invention relates to calcium halophosphate phosphors activated with antimony, terbium and manganese.

The primary object of the present invention is to add green emission to the emission of antimony—and manganese—activated calcium halophosphate phosphors normally used in fluorescent discharge lamps and to effect further improvements in the emission efficiency of the above-described phosphors.

The above and other objects, advantages and features of the present invention will become apparent as the description further proceeds.

Figure 1:
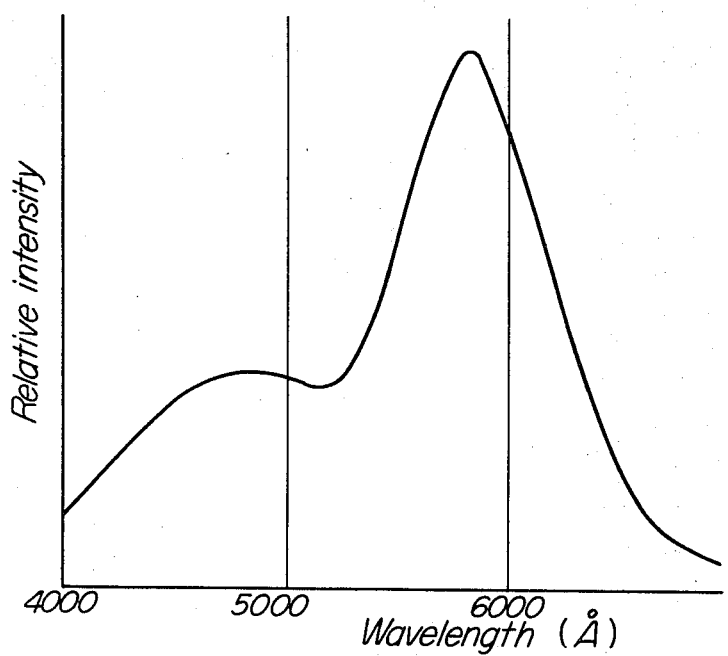
Figure 2:
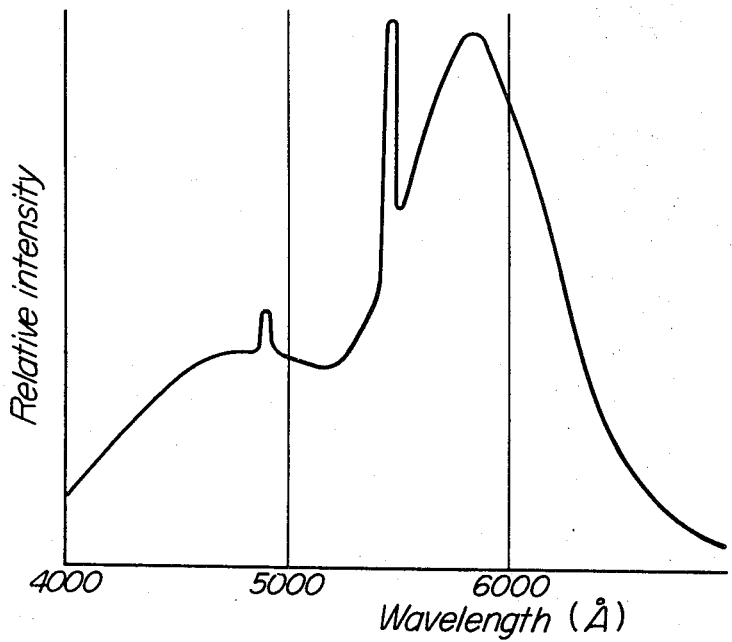

In the accompanying drawings:

FIG. 1 gives a spectral energy distribution of a conventional calcium halophosphate phosphor activated with antimony and managanese; and FIG. 2 gives a spectral energy distribution of the calcium halophosphate phosphor of the present invention which is activated with terbium, antimony and manganese.

Conventional calcium halophosphate phosphors have a composition given by

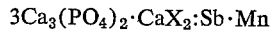

$$3Ca_3(PO_4)_2 \cdot CaX_2 : Sb \cdot Mn$$

where X represents a halogen or halogens. Such a phosphor can be considered as a compound consisting of 3 mols of calcium orthophosphate and 1 mol of calcium halide whose halogen is either fluorine or chlorine or a mixture of fluorine and chlorine. Such calcium halophosphate phosphors are generally activated with antimony and manganese. The phosphors activated with antimony only show blue white emission with a maximum at 4800 to 4900 A., while the phosphors activated with both antimony and manganese show the orange red emission due to manganese with a maximum at 5800 to 5900 A. in addition to the blue white emission of antimony. This is shown in FIG. 1. By varying the ratio of antimony to manganese the intensity of the blue white emission relative to the intensity of the red emission varies and the color of the total emission varies between a bluish daylight color and a yellowish warm white color.

This phosphor has two emission bands, that is, the emission band at 4800 A. and the emission band at 5800 A., but there is compared with the black body spectrum a shortage of green emission in the range between 5200 and 5500 A. since however, the visibility curve of the human eye has a maximum at 5550 A., it is possible by addition of some green emission to approximate better the black-body radiation and at the same time to improve the emission efficiency of the phosphor. In addition to the mentioned emissions, the above-described phosphor shows a weak emission at 3800 A. due to antimony. As the main part of this emission belongs to the ultraviolet range it can hardly contribute to the brightness of discharge lamps.

In an effort to improve the emission properties of such phosphors, the inventors discovered that calcium halophosphate phosphors activated with terbium antimony, and manganese show emission of terbium mainly represented by line emission having a peak at 5450 A. in addition to emissions of antimony and manganese, and thus the phosphor makes up for deficiency of green emission in the conventional calcium halophosphate phosphors and shows a higher radiant efficiency than the conventional phosphors.

Absorption of excitation energy by terbium ions takes place at wavelengths in the vicinity of 3800 A. and 4800 A. Accordingly terbium emission under 2537 A. ultraviolet ray excitation is quite weak, but terbium shows a rather strong emission under 3650 A. ultraviolet ray excitation. When the terbium ions coexist with a heavy metal activator having a maximum in the vicinity of 3800 A. or 4800 A., such as thallium or copper, a phosphor including these elements may show brilliant green emission due to sensitized luminescence developed therein. As we told before, a calcium halophosphate phosphor activated with antimony shows a weak emission having a maximum in the vicinity of 3800 A. in addition to the brilliant main emission with a maximum in the vicinity of 4900 A. In this case, terbium is sensitized by this 3800 A. emission. In ordinary fluorescent discharge lamps, that is, low-pressure mercury vapor discharge lamps mainly, ultraviolet rays at 2537 A. are generated within the lamp and in a lesser degree ultraviolet rays at 3650 A.

In a fluorescent discharge lamp employing the phosphor according to the present invention, therefore, beside the antimony emission under excitation with short wavelength ultraviolet rays at 2537 A. and 1850 A. and manganese emission sensitized by the antimony emission, terbium emission under 3650 A. ultraviolet rays and 3800 A. antimony emission under 2537 A. ultraviolet ray excitation for the terbium emission and to increase in this way the emission intensity by an amount of the order of 5 to 10%.

According to this invention the amount of terbium addition should be preferably within the range of 0.006 to 0.08 gram atom per gram atom of calcium, and the best effect is obtained when terbium is added in an amount of 0.01 to 0.04 gram atom per gram atom of calcium. When the amount of terbium is less than 0.006 gram atom per gram atom of calcium, sufficient terbium emission is not obtained and the color is degraded, while with a terbium addition of more than 0.09 gram atom per gram atom of calcium, lowering in brightness results.

A specific example of the phosphor according to the present invention will now be described.

Raw-mix constituents:                 Amounts (grams)
Calcium secondary phosphate ($CaHPO_4$) _____ 816
Calcium carbonate ($CaCO_3$) _____ 230
Calcium fluoride ($CaF_2$) _____ 39
Calcium chloride ($CaCl_2$) _____ 55.5
Antimony trioxide ($Sb_2O_3$) _____ 21.7
Manganese carbonate ($MnCO_3$) _____ 18
Terbium oxide ($Tb_4O_7$) _____ 37.4

The above-described components are thoroughly mixed and the mixture is fired for 1 to 3 hours at 1100 to 1250° C. The phosphor thus prepared shows a nearly white emission under 2537 A. ultraviolet ray excitation. The emission spectrum is as shown in FIG. 2.

What is claimed is:

1. A phosphor comprising calcium halophosphate activated with antimony, managanese and terbium characterized by a ratio of gram atoms of terbium to gram atoms of calcium in said phosphor between 0.006:1 and 0.08:1.

2. A phosphor as claimed in claim 1, wherein the ratio of gram atoms of terbium to gram atoms of calcium in said phosphor is between 0.01:1 and 0.04:1.

References Cited

UNITED STATES PATENTS

| | | | |
|---|---|---|---|
| 2,726,214 | 12/1955 | Ranby | 252—301.4 |
| 2,986,529 | 5/1961 | McKeag | 252—301.4 |
| 3,025,423 | 3/1962 | Rimbach | 252—301.4 |
| 3,430,090 | 2/1969 | Vodoklys et al. | |

OTHER REFERENCES

Butler et al.: Calcium Halophosphate Phosphors, Journal of the Electrochemical Society, September 1950, pp. 265–270.

TOBIAS E. LEVOW, Primary Examiner

R. D. EDMONDS, Assistant Examiner